United States Patent [19]

Ginosar et al.

[11] Patent Number: 5,812,993
[45] Date of Patent: Sep. 22, 1998

[54] DIGITAL HARDWARE ARCHITECTURE FOR REALIZING NEURAL NETWORK

[75] Inventors: Ran Ginosar, Nofit; Nitzan Weinberg, Haifa, both of Israel

[73] Assignee: Technion Research and Development Foundation Ltd., Haifa, Israel

[21] Appl. No.: 806,714

[22] Filed: Feb. 27, 1997

[51] Int. Cl.$^6$ .............................. G06F 15/18; G06E 1/00
[52] U.S. Cl. .............................. 706/26; 706/15; 706/25; 706/27; 706/41; 706/43
[58] Field of Search ................................ 395/24, 21, 23, 395/27; 706/26, 15, 25, 41, 43, 27

[56] References Cited

U.S. PATENT DOCUMENTS

| | | | |
|---|---|---|---|
| 5,485,548 | 1/1996 | Oteki et al. | 395/27 |
| 5,604,840 | 2/1997 | Asai et al. | 395/11 |

OTHER PUBLICATIONS

M. Yasungaga et al. "A Self–Learning Digital Neural Network Using Wafer–Scale LSI," IEEE Journal of Solid–State Circuits, vol. 28, No. 2, pp. 106–114, Feb. 1993.
J. Chung et al. "Exploiting the Inherent Parallelisms of Back–Propagation Neural Networks to Design a Systolic Array," 1991 IEEE International Conference on Nueral Networks, pp. 2204–2209, 1991.
Neural Network Aided Design for Image Processing, Ilia Vitsnudel, Ran Ginosar and Yehoshua Zeevi, SPIE vol. 1606, Visual Communication and Image Processing '91: Image Processing, pp. 1086–1091.
Digital VLSI Architecture for Neural Netrworks, S.Y. Kung and J.N. Hwang, ISCAS '89 IEEE, pp. 445–448.
A Self–Learning Digital Neural Network Using Wafer–Scale LSI, Moritoshi Yasunaga et al, IEEE Journal of Solid–State Circuits, vol. 28, No. 2, Feb. 1993, pp. 106–114.
A Generic Systolic Array Building Block For Neural Networks with On–Chip Learning, Christian Lehmann et al, IEEE Transactions on Neural Networks, vol. 4, No. 3, May 1993, pp. 400–406.
Design, Fabrication and Evaluation of a 5–Inch Wafer Scale Neural Network LSI Composed of 576 Digital Neurons, Moritoshi Yasunaga et al, pp. II –527–535.
Digital VLSI Multiprocessor Design for Nuerocomputers, Chia–Fen and Bing J. Sheu, 1992 IEEE, pp. II 1–6.
A Reconfigurable 'ANN' Architecture, T.H. Madraswaia et al, 1992 IEEE, pp. 1569–1572.
A Single 1.5–V Digital Chip for a 10 Synapse Neural Network, Takao Watanabe, IEEE Transactions on Neural Networks, vol. 4, No. 3, May 1993, pp. 387–393.
The Design of a Neuro–Microprocessor, John Wawrzynek et al, IEEE Transactions on Neural Networks, vol. 4, No. 3, May 1993, pp. 394–399.

*Primary Examiner*—Allen R. MacDonald
*Assistant Examiner*—Jason W. Rhodes
*Attorney, Agent, or Firm*—Browdy and Neimark

[57] ABSTRACT

A digital neural network architecture including a forward cascade of layers of neurons, having one input channel and one output channel, for forward processing of data examples that include many data packets. Backward cascade of layers of neurons, having one input channel and one output channel, for backward propagation learning of errors of the processed data examples. Each packet being of a given size. The forward cascade is adapted to be fed, through the input channel, with a succession of data examples and to deliver a succession of partially and fully processed data examples each consisting of a plurality of packets. The fully processed data examples are delivered through the one output channel. Each one of the layers is adapted to receive as input in its input channel a first number of data packets per time unit and to deliver as output in its output channel a second number of data packets per time unit. The forward cascade of layers is inter-connected to the backward cascade of layers by means that include inter-layer structure, such that, during processing phase of the forward cascade of neurons, any given data example that is fed from a given layer in the forward cascade to a corresponding layer in the backward cascade, through the means, is synchronized with the error of the given processed data example that is fed to the corresponding layer from a preceding layer in the backward cascade. The first number of data packets and the second number of data packets being the same for all the layers.

7 Claims, 8 Drawing Sheets

DIGITAL HARDWARE ARCHITECTURE FOR REALIZING NEURAL NETWORK

This application claims the benefit of U.S. provisional application Ser. No. 60/812,988, filed Mar. 7, 1996.

FIELD OF THE INVENTION

The present invention concerns a digital hardware architecture for realizing neural networks.

Throughout the description, reference is made to the following list of references:

REFERENCES

1. Vitsnudel, I., Ginosar, R., Zeevi, Y., "Neural Network Aided Design for Image Processing," *SPIE Visual Comm. and Image Proc.* 9, In Image Processing, 1606:1086–1091, November 1991.

2. Yasunaga, M., Masuda, N., Yagyu, M., Asai, M, Yamada, M., Masaki, A., Design, Fabrication and Evaluation of A 5-Inch Wafer Scale Neural Network LSI Composed of 576 Digital Neurons", *IJCNN*, 2:527–535, 1990.

3. Yasunaga, M., Masuda, N., Yagyu, M., Asai, M., Shibata, K., Ooyama, M., Yamada, M., Sakaguchi, T., and Hashimoto, M., "A Self-Learning Digital Neural Network Using Wafer-Scale LSI", *IEEE Journal of Solid-State Circuits*, 28(2):106–113, February 1993.

4. Wawrzynck, J., Asanovic, K., and Morgan, N., "The Design of a Neuro-Microprocessor", *IEEE Trans. on Neural Networks*, 4(3):394–399, May 1993.

5. Hammerstrom, D., "A VSLI Architecture for High-Performance, Low-Cost, On-chip Learning", *IJCNN*, 2:537–544, 1990.

6. Kung, S. Y., and Hwang, J. N., "Digital VLSI Architecture for Neural Networks", *Proc. of the IEEE Int. Symp. on Circuits & Systems*, 1:445–448, 1989.

7. Madraswala, T. H., Mohd, B. J., Ali, M., Premi, R., and Bayoumi, M. A., "A Reconfigurable ANN Architecture", *IEEE Int. Symp. on Circuits & Systems*, 3:1569–1572, 1992.

8. Watanabe, T., Kimura, K., Aoki, M., Sakata, T., and Ito, K., "A Single 1.5-V Digital Chip for a $10^6$ Synapse Neural Network", *IEEE Trans. on Neural Networks*, 4(3):287–393, May 1993).

9. Lehmann, C., Viredaz, M., and Blayo, F., "A Generic Array Building Block for Neural Networks with On-Chip Learning", *IEEE Trans. on Neural Networks*, 4(3):400–406, May 1993.

10. Chang Chiz-Fen and Sheu, B. J., "Digital VLSI Multiprocessor Design for Neurocomputers", *IJCNN*, 2:1–6, 1992.

11. Myers, D. J., Vincent, J. M., Cox, A. L., Harbridge, J. R., Orrey, D. A., Williamson, C. A. and Naylor, D. J., "A High Performance Digital Processor for Implementing Large Artificial Neural Networks", *BT Technology Journal*, 10(3):134–143, July, 1992.

12. Weinberg, N. and Ginosar, R., "A Digital Systolic Neural Network Chip (DSNC)", *Technical Report, Electrical Engineering Department, Technion—Israel Institute of Technology*, Israel, July 1995.

BACKGROUND OF THE INVENTION

Neural networks offer an attractive implementation for some complex image processing algorithms see e.g. [1]. The linear combination part of the standard neuron can implement linear image convolutions, and the non-linear output function offers additional capabilities. While it is often extremely difficult to construct empirically a traditional image processing algorithm for non-trivial tasks, the self-learning capabilities of neural networks can be exploited for some image processing applications in an automatic way. However, available high performance architectures for neural network processing do not support such applications in an efficient manner.

A number of digital parallel architectures for neural network processing have been described in the literature [2–11]. Some of them are limited to forward processing only [2, 8], while others support learning as well [3–7, 9–11]. Some architectures employ systolic data flow [6, 9, 10], and the others use only broadcast. As is well known, "Systolic" processing means: In systolic computation, dataflaws rhythmically from one processing unit to another each clock cycle. The multiple identical or similar processing units operate on the data simultaneously, each unit processing a different part of the data at the same time. For the latter definition and a detailed discussion in a systolic concept see, K. K Parhi, R. Chassaing, B. Bitler, VLSI for Signal Processing—special systems, in: Richard C. Dorf (editor in chief), The electrical engineering handbook, IEEE Press and CRC Press, 1993. All those architectures employ a single channel for data sharing among the neurons and across the layers, which limits processing to only one input datum at each cycle. The use of a single channel is also twice as slow learning as forward processing since data can flow in the network in only one direction. Image processing handles large amounts of data, and if real-time speed is required (30 images per second), then none of the above architectures provide a suitable solution when implemented e.g. with hitherto known technology.

There follows a brief description of known per se Forward Processing and Back Propagation learning algorithm in neural network architecture. A detailed discussion of these concepts is given in Richard P. Lippman, An introduction to computing with neural nets, IEEE ASSP Magazine, April 1987, pp. 4–22

Forward Processing

A brief description of typical, known per se, forward algorithm is given below with reference to FIG. 1. Consider a multi-layer network where layer Q precedes layer R and each layer contains q and r neurons, respectively. As illustrated in FIG. 1, an output from a neuron in layer R is as follows:

$$Y.R(i) = f.R(V.R(i)) \quad (1)$$

$$V.R(i) \left[ \sum_{j=1}^{q} Y.Q(j)*W.R(i,j) \right] + B.R(i) \quad (2)$$

where:

Y.R(i) is the output of neuron i in layer R;

Y.Q(j) is the output of neuron j in layer Q and is also the jth input to each neuron in layer R;

W.R(i.j) is the weight assigned in neuron i (in layer R) to its jth input;

B.R(i) is the bias for the neuron i in layer R;

V.R(i) is the sum of the weighted inputs and bias for neuron i in layer R;

f.R is the output function for all the neurons in layer R.

Still further, a typical, known per se, basic back propagation learning algorithm is given below:

Learning Algorithm

The Back Propagation supervised learning algorithm with variable learning rate is supported. Each example is presented to the network together with a corresponding desired output. The algorithm minimizes the difference (error) between the network and the desired outputs for every example. This is carried out by calculating the change that must be applied to each weight and bias for each example presented to the network. All weight and bias changes are accumulated over all input examples (an epoch). Subsequently, weights and biases are updated, and the next epoch can begin. This process is repeated until the error reaches the desired level or ceases to improve.

The weights and biases in layer R are changed as follows:

$$W.R(i,j)_{NEW} = W.R(i,j)_{OLD} + \Delta W.R(i,j)_{EPOCH} \quad (3)$$

$$B.R(i)_{NEW} = B.R(i)_{OLD} + \Delta B.R(i)_{EPOCH} \quad (4)$$

where:

$\Delta W.R(i,j)_{EPOCH}$ is the total accumulated weight change associated with the jth input to neuron i in layer R during one epoch;

$\Delta B.R(i)_{EPOCH}$ is the total accumulated bias change for neuron i in layer R during one epoch.

For each input example x, a weight and bias change are calculated according to the following equations:

$$\Delta W.R(i,j)_x = \eta * \delta.R(i) * Y.Q(j) \quad (5)$$

$$\Delta B.R(i)_x = \eta * \delta.R(i) \quad (6)$$

where:

$\delta.R(i)$ is the error of neuron i in layer R;

$\eta$ is the learning rate;

$\Delta W.R(i,j)_x$ is a single weight change to the weight of the jth input to neuron i in layer R; note that $$\Delta W.R(i,j)_{Epoch} = \sum_{x \in Epoch} \Delta W.R(i,j)_x$$

$\Delta B.R(i)_x$ is a single bias change for neuron i in layer R; note that $$\Delta B.R(i)_{EPOCH} = \sum_{x \in EPOCH} \Delta B.R(i)_x$$

The error depends on whether the present layer is the last one in the network. For the last layer of the network, say layer S, the error calculated for each neuron is:

$$\delta.S(i) = (t(i) - Y.S(i)) * f.S'(V.S(i)) \quad (9)$$

where:

t(i) is the desired output from neuron i in layer S;

f.S' is the derivative of the output function for layer S.

For a hidden layer, say layer R, preceded by Q and succeeded by S (containing s neurons), the error calculated for each neuron is:

$$\delta.R(i) = f.R'(V.R(i)) * \sum_{j=1}^{S} \delta.S(j) * W.S(j,i) \quad (10)$$

It is accordingly an object of the present invention to provide for a digital systolic neural network capable of realizing forward processing and back propagation learning simultaneously.

SUMMARY OF THE INVENTION

The four terms that will be used frequently in the following description and appended claims:

1. Data Packet—a data unit (typically but not necessarily 9 bit long) that is fed to the digital neural network of the invention. The data packet propagates in the internal bus(es) of the chip and is delivered as output from the network after having been processed by the network. Insofar as image processing application is concerned, data packet that is fed to the first layer of the network during the processing phase normally corresponds to a pixel.

2. Data set—the number of data packets that are fed simultaneously to the neural network on a single channel.

3. Data example—a collection of data packets that constitute one example during processing of the neural network. Thus, for example, a 5×5 (i.e. 25 data packets or 5 data sets) neighboring pixels of a given pixel, form one data example.

4. Epoch—a collection of data examples that should be fed to and processed by the neural network, during learning phase, in order to gather "sufficient error information" that will allow change of the network's parameters, i.e. weights and/or biases.

It should be noted that for clarity, the proposed architecture of the invention is described with reference to image processing application. Those versed in the art will readily appreciate that the invention is, by no means, bound by this exemplary application.

A Digital Systolic Neural Network Chip (e.g. DSNC) of the invention implements a high performance architecture for real-time image processing. It can be used as a single or a multi-layer neural network. The proposed architecture supports many forward algorithms and the Back Propagation learning algorithms which are utilized in parallel. The chip is designed for fast execution of both forward processing and learning, and the latter can be carried out at essentially the same speed as the former. The output and derivative functions (i.e. f'.R) in each layer, as well as the network topology, are user defined. The output and derivative functions are normally although not necessarily realized as a Look up Table (LUT).

In a specific example of 25 neurons, arranged in 5 consecutive banks, each holding 5 neurons, 25 data packets are supported for each computation, making the DSNC suitable for real-time image processing of 5×5 pixel neighborhoods. Preferably, although not necessarily signed integer arithmetic is employed with e.g. 9-bit input/output precision and e.g. 8-bits for weight and biases. The output forward value and the error calculated in each neuron are normalized to nine bits, thus taking advantage of the full dynamic range available to them. Four data channels are employed, each capable of carrying five data packets, handling 20 parallel buses in total. By concatenating multiple DSNCs, almost any size neural network can be constructed for real-time image processing.

Accordingly, the present invention provides for a digital neural network architecture that includes a forward cascade of layers of neurons, having one or more input channel and one or more output channels, for forward processing of data examples that include, each, a plurality of data packets. A backward cascade of layers of neurons, having one or more input channels and one or more output channels, for backward propagation learning of respective errors of the processed data examples; each packet being of a given size;

The forward cascade is adapted to be fed, through the one or more input channels, with a succession of data examples and to deliver a succession of partially and fully processed data examples each consisting of a plurality of packets. The fully processed data examples are delivered through said one or more output channels;

Each one of the layers is adapted to receive as input in its input channel a first number of data packets per time unit and to deliver as output in its output channel a second number of data packets per said time unit;

the improvement wherein:

(i) the forward cascade of layers is inter-connected to the backward cascade of layers by means that include inter-layer structure, such that, during processing phase of the forward cascade of neurons, any given data example that is fed from a given layer in the forward cascade to a corresponding layer in the backward cascade, through said means, is essentially synchronized with the error of said given processed data example that is fed to said corresponding layer from a preceding layer in said backward cascade; and (ii) The first number of data packets and the second number of data packets being essentially the same for all said layers.

Preferably, the computation propagates in a systolic manner.

The invention further provides for a digital neural network architecture that includes a forward cascade of layers of neurons, having one or more input channels and one or more output channels, for forward processing of data examples that include, each, a plurality of data packets; and a backward cascade of layers of neurons, having one or more input channels and one or more output channels, for backward propagation learning of respective errors of the processed data examples; each packet being of a given size;

The forward cascade is adapted to be fed, through the one or more input channels, with a succession of data examples and to deliver, a succession of partially and fully processed data examples each consisting of a plurality of packets; the fully processed data examples are delivered through the one or more output channels;

Each one of the layers is adapted to receive a first number of data packets per time unit and to deliver as output a second number of data packets per said time unit;

the improvement wherein:

(i) each layer includes at least two banks of neurons operating in a systolic manner;

(ii) each data example is partitioned to plurality of data sets each consisting of at least two data packets;

(iii) the forward cascade of layers is inter-connected to the backward cascade of layers by means that include plurality of inter-layer structure, such that, during processing phase of said forward cascade of neurons, any given data example that is fed from a given layer of the forward cascade to a corresponding layer in the backward cascade, through said means, is essentially synchronized with the error of said given processed data example that is fed to said corresponding layer from a preceding layer in said backward cascade.

(iii) the first number of data packets and the second number of data packets being essentially the same for all said layers.

Still further the invention provides for a digital neural network architecture that includes a forward cascade of layers of neurons for forward processing of data examples that include, each, a plurality of data packets. A backward cascade of layers of neurons, having one or more input channels and one or more output channel, for backward propagation learning of respective errors of the processed data examples; each packet being of a given size;

a forward cascade of $l(l>1)$ layers of neurons having respective indices $(1, \ldots l)$, wherein each layer$_i$ $(i=1 \ldots l)$ in the cascade having n neuron and having the following layer structure:

(a) it is coupled to an input channel of at least one $k_{i1}$ input buses and an output channel of $k_{i2}$ output buses;

(b) it comprises one or more banks of neurons where each bank includes $m_i$ neurons where $m_i = k_{i1} * i_i$, $n = m_i * j_i$ and $m_i = k_{12} * o_i$;

said digital neural network further includes:

a backward cascade of l layers of neurons having respective indices $(l+1, \ldots 2l)$ and having each said layer structure, with the input layer of the backward cascade, having said index $l+1$, being inter-connected to both the output layer of said forward cascade, having said index l, and to additional output, thereby constituting a cascade of 2l layers each associated with essentially identical propagation period T where the latter being the elapsed time for propagating data between the at least one input channel and at least one output channel of each layer$_i$ from among said 2l layers.

The network further having inter-layer pipeline structure for attaining systolic operation of the backward and forward cascades such that the input to each layer having index i in the forward cascade is also fed as input, after having been delayed for a delay period $T_i$ by the inter-layer structure that include hard-wired logic to a corresponding layer having index $(2l-i+1)$ in the backward cascade, such that said delay time $T_i$ equals $(4l-4i+3)$ times said propagation period T.

$i_i$ and/or $j_i$ may or may not be integers, all as required and appropriate.

The realization of the neural network of the invention is not confined to a specific chip arrangement. Thus, a chip may constitute one layer with forward (and possibly also backward propagation) constituent. By this embodiment a neural network of n layers is realized by n distinct chips. Alternatively a single chip may encompass only portion of a layer, or if desired, more than one layer. Those versed in the art will, therefore, appreciate that the design of the chip in terms of the neural network portion that is realized is determined as required and appropriate, depending upon the particular application.

BRIEF DESCRIPTION OF THE DRAWINGS

For a better understanding, the invention will now be described with reference to the accompanying drawings, in which.

DESCRIPTION OF PREFERRED EMBODIMENTS

Figure 1:
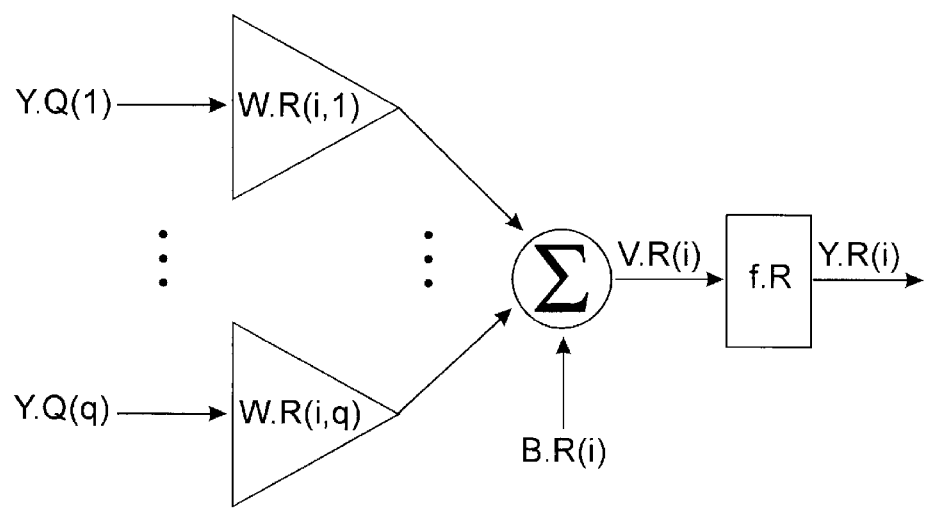
FIG. 1 illustrates schematically hardware architecture of a neuron in a forward processing neural network.

Multiple alternative VLSI architectures can be designed for efficient execution of neural networks for real-time image processing tasks. For simplicity, and for network partitioning reasons, only architectures in which each chip computes a single layer of the neural network is considered. By this particular example, the architecture is preferably subject to two implementation constraints in order to be implemented with current technology, (i) the chips are limited to one million gates and (ii) 500 I/O pins. In addition, it is proposed that many useful image processing tasks can be accomplished with 5×5 pixel neighborhoods. Thus, the digital VLSI neural network architectures having up to 25 neurons and up to 25 inputs per layer are considered. The neurons will support multiple forward algorithms, as well as the Back Propagation learning algorithm. I/O data precision is chosen to be nine bits (to provide for signed 256 gray-levels) and weight precision is 8 bits.

Under the above exemplary constraints (1 MGates, 500 I/O pins, and 25 neurons/layer I/O data precision 9-bits and weight precision 8-bits) an optimal price performance is sought. Preferably, (although not necessary) systolic architectures are employed, and assume that each algebraic calculations (such as additions and multiplications) are completed during one clock cycle. To maximize hardware utilization, the pipeline should preferably be balanced, in the sense that all other operations should require substantially similar time to complete.

As will be explained in greater detail below, when the number of physical neurons is less than 25, multiple cycles are required for execution of the 25 logical neurons of the network layer, and similarly for the inputs. The proposed solution assumes balanced architectures, namely architectures containing no idle resources when fully loaded. For example, if each multiplication is completed in one clock cycle, there is no need for more multipliers than there are inputs to each neuron. If the algebraic operations (e.g. multiplication) requires more than one cycle then known per se techniques such as pipelining or time sharing of multipliers may be used in order to complete the operation while maintaining the same input and output throughput.

It is desired to design the architectures so as to execute Back Propagation learning at essentially the same speed as forward processing. This is motivated by the many research and development applications where learning constitutes the principal time consuming effort. Analyzing the algorithmic data flow of Back Propagation can be performed along similar directions, and the results are already incorporated in the architecture described herein. Note that if learning is eliminated, or is designed for substantially lower performance than forward processing, the chip size can be reduced or, alternatively, faster architectures which can process larger images in real-time can be designed under the same constraints.

Before turning to a detailed discussion of one proposed architecture, it should be noted that the various constraints specified in the above discussion exemplifies the motivation in designing a neural network that meets one's needs. It should be emphasized that the present invention is by no means bound by the specified constraints. Thus, for example, the proposed architecture is not bound to one layer. The maximal allowed number of gates and the I/O pads are determined depending upon the particular application. The implementation is not confined to 5×5 pixel neighborhoods. Likewise, 25 neurons, nine bits data precision and weight precision of eight bits are only one example. It is not necessary to complete the algebraic operations during one clock cycle. The pipeline should not necessarily be balanced and alternative combinations of parallel and serial architectures may be realized. Whilst balanced architecture is preferable this is not necessarily obligatory.

Accordingly, the various constraints that are mentioned herein may be adjusted or eliminated, and other constraints may be imposed all as required and appropriate, depending upon the particular application.

A Description of a Preferred DSNC Architecture

Figure 2:
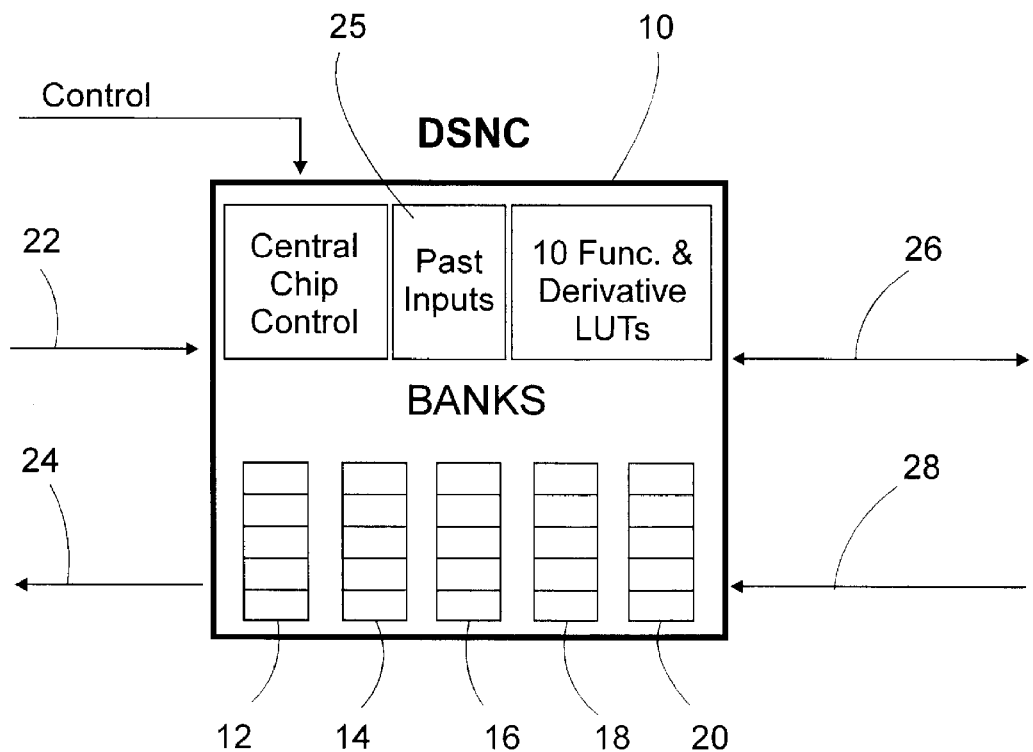
FIG. 2 illustrates generally a DSNC architecture realizing a single layer forward processing and backward learning, according to one embodiment of the invention.

There follows a description of some variants of one exemplary architecture in which a Digital Systolic Neural Network Chip (DSNC) realize one-layer (both forward and backward propagation learning (hereinafter "one-layer DSNC architecture")). Referring at the onset to FIG. 2, the exemplary DSNC architecture 10 implements one layer of 25 neurons and up to 25 data packets to each neuron for each computation. If desired, less than 25 data packets may be fed to the first layer (e.g. 3×3). In this case, several neurons (and possibly also in interim layers) in the first layer will be rendered inoperative. The 25 inputs are presented in five consecutive cycles of data sets of five data packets each. The 25 neurons are grouped in five banks 12, 14, 16, 18, and 20, respectively, each containing five neurons. As will be explained in greater detail below, each neuron is capable of realizing both the forward and backward execution. Neurons residing in the same bank perform the same operations in parallel. All five banks operate systolically in parallel on different input data sets. Data to and from the chip are carried over two input channels 22, 28 and two output channels 24, 26.

Figure 3:
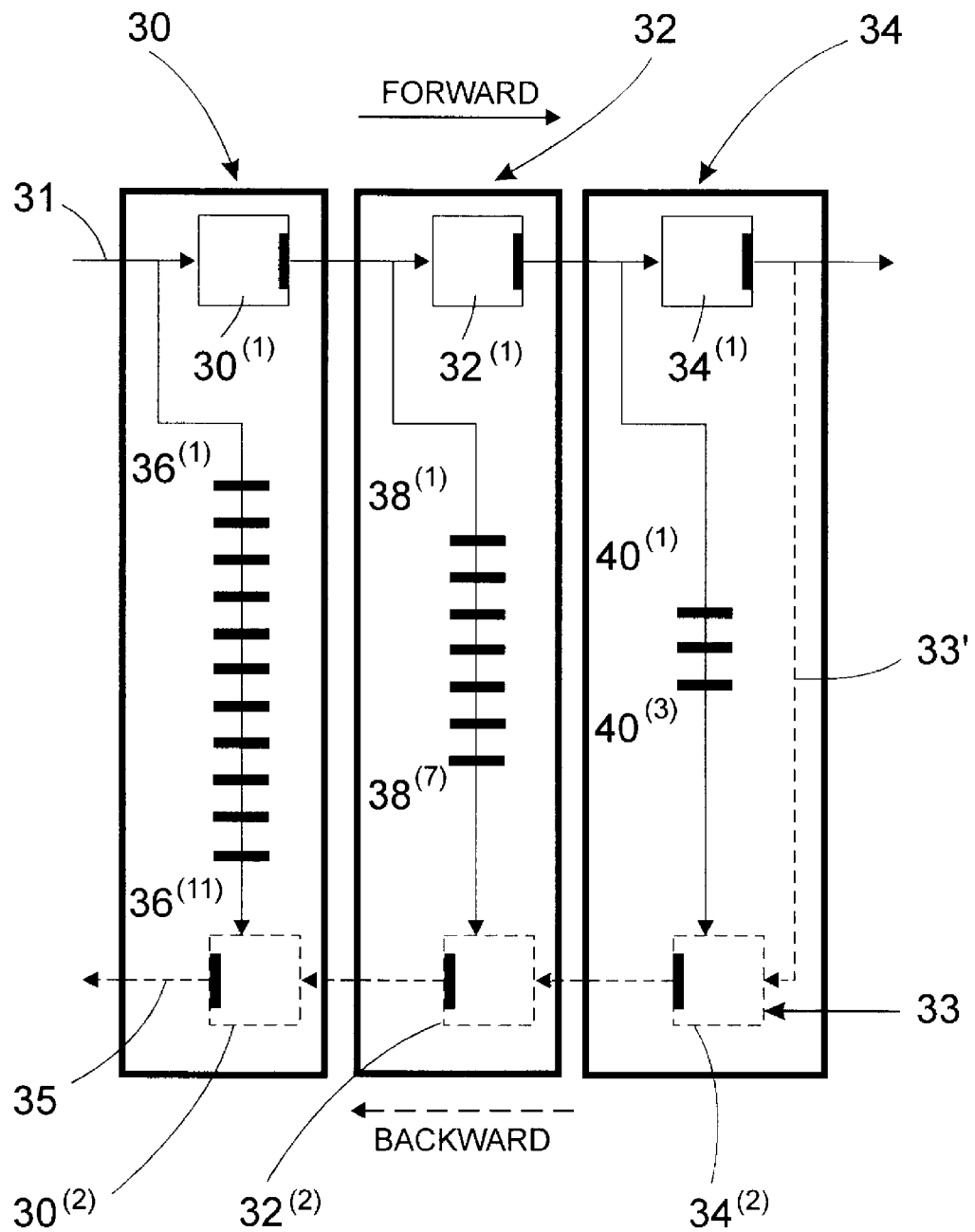
FIG. 3 illustrates schematically a 3-layer architecture for forward processing and back propagation learning, according to one embodiment of the invention.

Attention is now direct to FIG. 3, showing a 3-layer architecture for forward processing and back propagation learning, according to one embodiment of the invention. The 3-layer architecture consists of 3 layers 30, 32, 34 each constituting a separate DSNC, such that 30$^{(1)}$, 32$^{(1)}$ and 34$^{(1)}$ constitute the forward processing constituents of respective DSNCs 30, 32 and 34 and 30$^{(2)}$, 32$^{(2)}$ and 34$^{(2)}$ constitute the back propagation learning constituents of said DSNCs. Each one of the DSNC chips 30, 32 and 34 has a general structure, as illustrated in FIG. 2.

Since most networks make use of up to l=three layers, the architecture is optimized for fast learning when using such networks. As is well known, back propagation learning on an data example (several data packets) occurs only after the forward processing of that example has already been completed throughout the network. Immediately afterwards, weight-changes associated with that input example are calculated, and the same inputs are utilized again for this calculation. Hence, the architecture should provide for intermediate internal storage of the inputs, since it is impractical to read them again.

Learning is carried out in the network in the opposite direction to forward processing, i.e., from the last layer 34 to the first 30 utilizing to this end DSNC constituents $34^{(2)}$, $32^{(2)}$ and $30^{(2)}$. Thus, the total length of the inter-layer pipeline consists of six layers (three forwards, three backwards) as shown in FIG. 3. While learning at full speed (a new data set entering every clock cycle), the three-layer network confronts a time lag of eleven input data examples between the entry of the inputs of the first example and the time they are used again in the first layer. To ensure the availability of these inputs without inputting them again, e.g. a 275 9-bit entry FIFO buffer being an exemplary inter-layer structure is incorporated in the chip. (275 stands for 11 registers each holding 25 data packets, 9-bit long each). The FIFO buffer is depicted as "past inputs" block 25 in the DSNC of FIG. 2. At any given time this FIFO stores the last 11 data examples (consisting each of 25 data packets) that have entered the chip, and presents them (over the Past Input Channel) at the proper time to the backward stages of the neurons. The last 11 data examples are fed at the correct timing to the appropriate constituent of the back propagation section by means of hard-wired registers. Thus, the data example that is fed to constituent $30^{(1)}$ should be fed after 11 time delays together with the error of the same processed data example after having been processed by 5 constituent $30^{(1)}$, $32^{(1)}$, $34^{(1)}$ $34^{(2)}$ and $32^{(1)}$.

To this end, 11 registers $36^{(1)}$ ... $36^{(11)}$ having the same time delay as constituents $30^{(1)}$, $32^{(1)}$, $34^{(1)}$, $34^{(2)}$ and $32^{(2)}$ assure that constituent $30^{(2)}$ will be fed essentially simultaneously with processed data example and data example from constituent $32^{(2)}$ and $36^{(11)}$, respectively.

In a similar manner, registers $38^{(1)}$, $38^{(2)}$ and $38^{(7)}$ assure that constituent $32^{(2)}$ will be fed essentially simultaneously with processed data example and data example from constituents $34^{(2)}$ ... $38^{(7)}$, respectively.

Similarly, 3 registers $40^{(1)}$, $40^{(2)}$ and $40^{(3)}$ assures that constituent $34^{(2)}$ will be fed essentially simultaneously with data from constituents $32^{(1)}$ $34^{(1)}$ and also with desired data outputs. In the latter case, a desired data output, fed via channel 33 and fully processed output of constituent $34^{(1)}$, fed to channel 33', will be synchronized with the inputs partially processed output from constituents $32^{(1)}$ for proper execution of algorithmic expression No. 9.

It should be noted that whereas FIG. 3 illustrates three-layer architecture, the invention is, of course, not bound by this configuration. Thus, for example, should four layer architecture be employed, i.e. a fourth layer will be concatenated to layer 34, this will require use of four constituent for each one of the forward and backward cascades of the network. Accordingly the inter-layer registers that link input 31 to constituent $30^{(2)}$ will amount for 15 registers, the inter-layer registers that link the input of the second layer 32 in the forward cascade to constituent $30^{(2)}$ will amount for 11 registers, and so forth.

Generally speaking, a maximum of L*4−1 registers are required for linking the input layer in the forward cascade to the last constituent of the learning cascade, where L stands for the number of layers. In the specific example of FIG. 3 said maximum number of registers equals 4*3−1, i.e. 11 registers. In layer i, 4L−4i−3 registers out of the maximum of 4L−1, are used.

As shown in FIG. 3, input data to the chip enters through two input channels; the Input Forward Channel 31 and the Input Learning Channel 33. Each channel consists of five 9-bits buses in order to accommodate 5 inputs 9-bit long each. A channel transfers a data set of five data packets, all of the same type. (Normally, during forward processing phase, each data packet (entered to the first layer) is indicative of a pixel value from among the 5×5 neighboring pixels). The channels serve multiple purposes, depending on whether the chip is processing an image, being programmed, or finalizing an epoch. When the chip processes an image, the Input Forward Channel 31 loads the input image data and the Input Learning Channel loads errors from the next layer (or the desired output, if it is the last layer). At chip initialization and programming time, the Input Forward Channel loads the initial weights, biases and the learning rate, and the Input Learning Channel loads the initial weights into the learning section. Finally, at the end of each epoch, the old weights are replaced by the new ones which have been learned. During that stage, the Input Learning Channel 33 receives the updated weights from the next layer.

The input data, as well as the previous inputs stored in the Past Inputs buffer, flow between the banks in a systolic manner as explained below with reference to FIG. 4.

Figure 4:
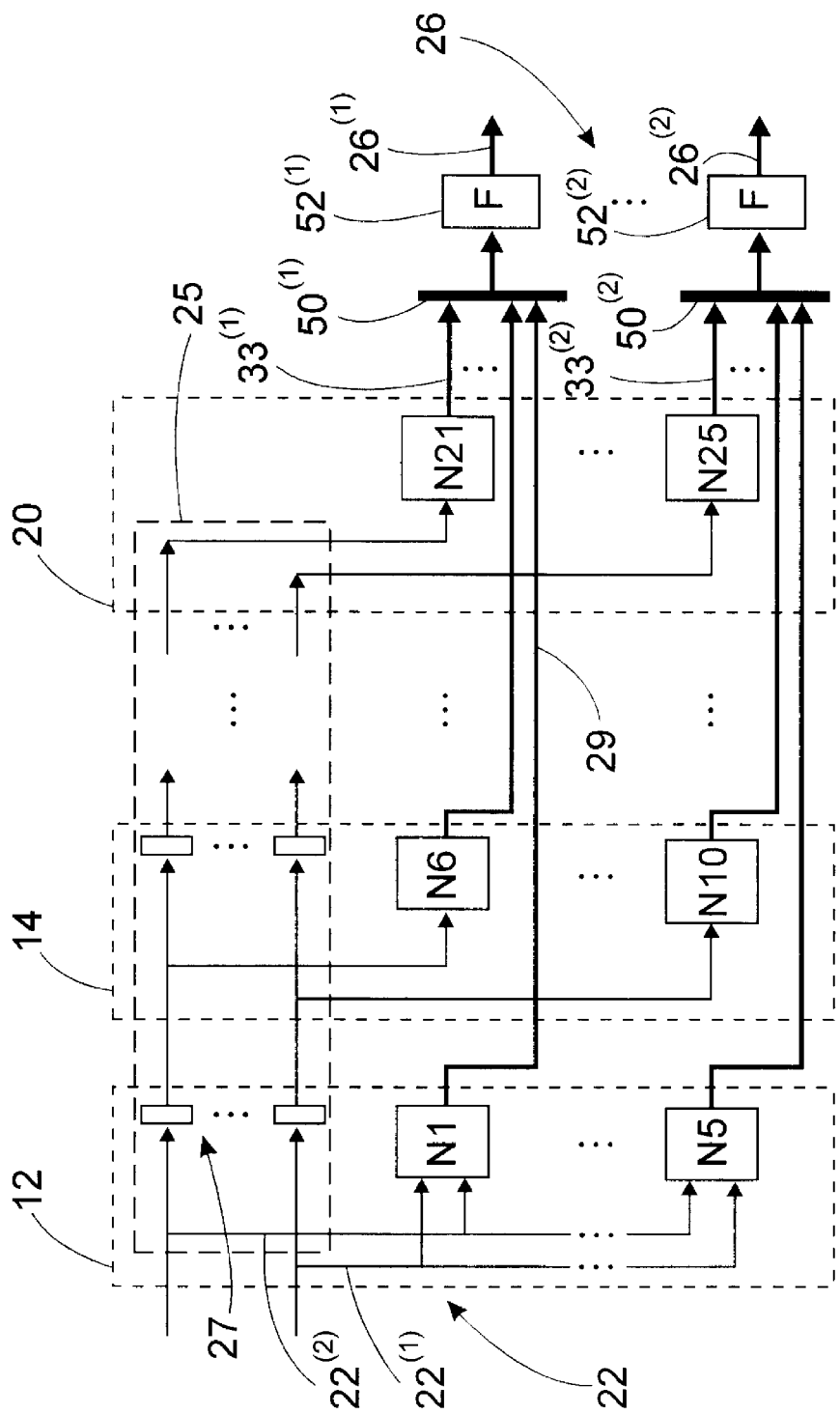
FIG. 4 illustrates a systolic structure of the forward processing constituent of the DSNC chip of FIG. 2.

To reduce the number of I/O pads required for the chip, as well as the internal fan-out of inputs, a systolic structure for input distribution is employed, as shown in FIG. 4. In FIGS. 2 and 4, like members are designated by like reference numerals. For simplicity, FIG. 4 shows only the Forward Input Channel lines 22 and 26, but similar lines also bring systolically the other types of inputs (the Past Inputs and Input Learning Channels) to the neurons. The input channel 22 consists of 5 buses each inputting one data packet of 9-bits. Only five data packets enter each neuron at each cycle (from each Channel), and 5 cycles are required if the maximum of 25 inputs are utilized. For clarity only, FIG. 4 depicts only 2 input buses $22^{(1)}$, $22^{(2)}$ from among the 5 which are actually coupled thereto.

The systolic approach, in addition to reducing I/O pads and fan-out requirements for input data, also makes efficient use of the output and derivative functions.

Figure 5:
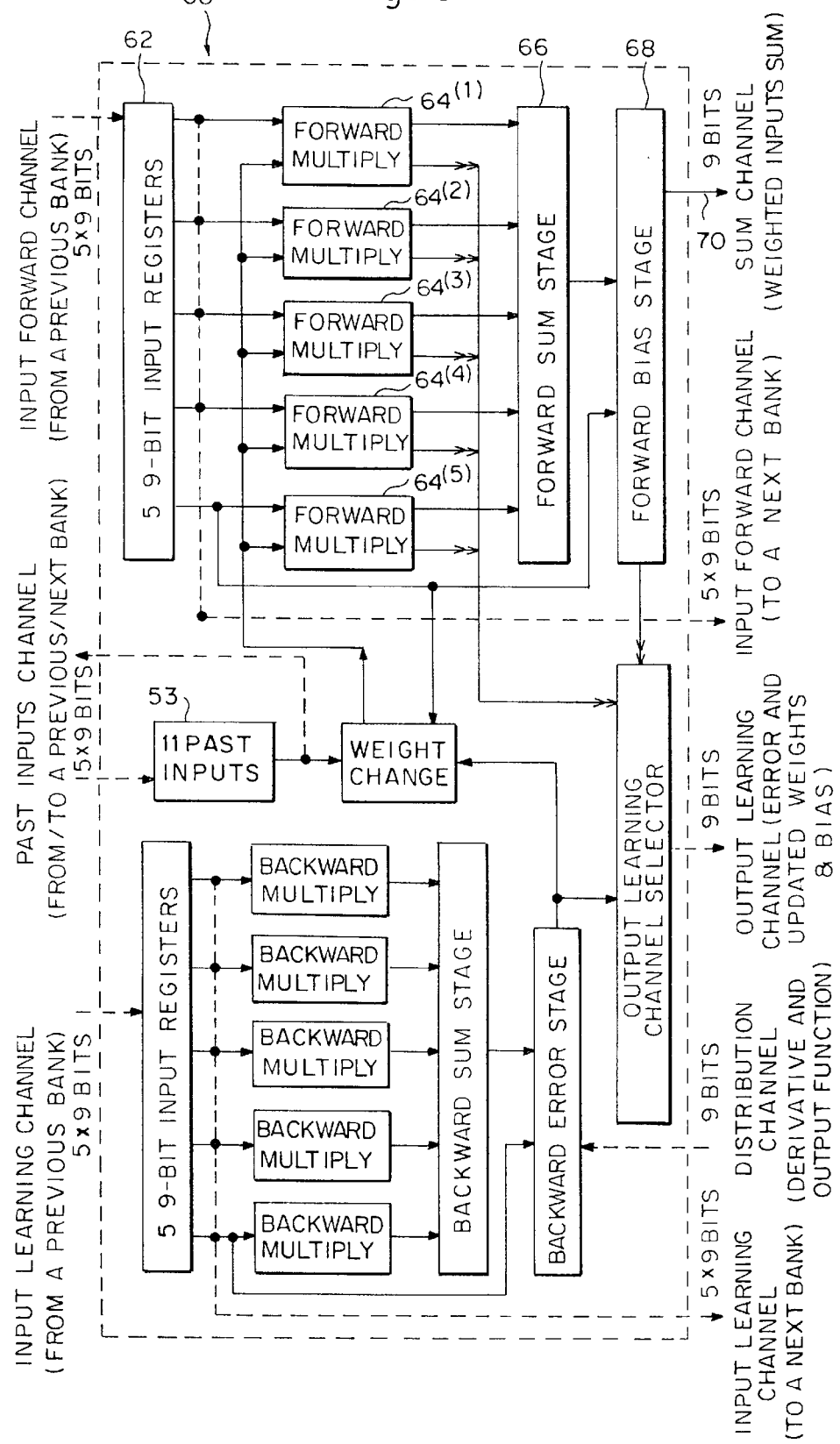
FIG. 5 illustrates a typical neuron structure, according to one embodiment of the invention.

Output data are produced on two channels, the Output Forward Channel 26 and the Output Learning Channel (24 in FIG. 4 or 35 in FIG. 5). Each channel consists of five 9-bit buses, and outputs a data set of five data packets, all of the same type. The Output Forward Channel 26 is a bidirectional channel. When programming the chip for execution, the output function and its derivative are fed into the chip through this channel; when processing an image, the outputs of a whole bank (five neurons) are presented on the channel via the output LUTs $26^{(1)}$ ... $26^{(5)}$ (of which only $26^{(1)}$ and $26^{(5)}$ are shown in FIG. 4). The Output Learning Channel carries the errors of a whole bank towards the previous layer, for each input example. Thus, when referring to FIG. 5, the output of $34^{(2)}$ carries the errors of the third layer 34 to the input of layer $32^{(2)}$ in the second layer 32 and likewise, the output of $32^{(2)}$ carries the errors of the second layer 32 to the first layer 30.

These channels can also be used in a known per se manner by the host to monitor the learning progress of the network.

Normally, DSNC accommodates $j_i$ banks each of which holding up to $m_i$ neurons, such that $m_i * j_i = n$; and if n is not an integral product of $m_i$, then $j_1$ can be a non-integer number. Moreover, the DSNC can receive inputs over $k_{i1}$ buses and can generate outputs over $k_{i2}$ buses, such that $m_i = k_{i1} * i_i$ and if $m_i$ is not an integral product of $k_{i1}$, then $i_i$ is not an integer number, and further $m_i = k_{i2} * o$, and if $m_i$ is not an integral product of $k_{i2}$, then $o_i$ is not an integer number.

The output function and its derivative associated with the layer are stored in look-up-tables. There are five identical LUTs for output functions and five for derivatives. All five LUTs of the same kind contain the same values. Each LUT contains 512 9-bit entries. The contents of the LUTs are user defined and are fed into the chip through the Output Forward Channel when programming the chip.

Each neuron computes the sum of its weighted inputs. The sum is used to address the LUTs and retrieve the appropriate output and derivative values. An internal Sum Channel 70, comprising five 9-bit buses, transfers in parallel the five sums of a single bank to the LUTs. In consecutive cycles, consecutive banks send their sum outputs over the Sum Channel, thus enabling efficient time sharing of the LUTs.

In learning mode, neurons in the last layer of the network need to receive from the LUTs both the derivative and the output values. In order to distribute these data, a separate Distribution Channel enters each bank. Two of these channels operate simultaneously, carrying output and derivative values. Thus, a bank can start error calculations when receiving the output values. On the following cycle it receives the derivatives (which are only then required), while the next bank receives its output values (to start its own error calculations). In all layers other than the last one, only one Distribution Channel operates since only derivative values are required.

Normally, when using a DSNC, there are three distinct operational modes: initialization, processing, and concluding an epoch. In order to use the chip efficiently and at the highest performance, every mode requires data to be entered in a well organized fashion. The principal rule to remember while using this architecture is that input data flows systolically between the five banks, and accordingly there is a time lag of one clock cycle between the composition of calculations in adjacent banks. The hereinbelow description will predominantly focus in the operation of the proposed architecture in the processing stage. The known per se aspects of the initialization and concluding an epoch stage will not be expounded upon herein.

Initialization

The organization of weights (in forward and backward stages) into register files depends on the order in which inputs enter the neuron. For example, the first pile of registers in each neuron holds the weights for inputs No. 1, 6, 11, 16, 21 out of the total 25 data packets which enter in five consecutive input cycles. In order to take advantage of the systolic architecture, the weights should be loaded into the banks from last bank to first bank. Weight initialization requires five input cycles per neuron, or 125 clock cycles to initialize all 25 neurons. The biases and the learning-rate are initialized likewise, each taking five clock cycles. An 8-bit weight is appended with an allow-change bit which controls the learning of the networks. If an allow-change bit is zero, the corresponding weight is not allowed to change during learning.

The output and derivative functions are loaded into the LUTs via the bi-directional Output Forward Channel. The data are entered serially, and each entry is loaded simultaneously to all five identical LUTs. The two sets of LUTs (for the output and derivative functions) are loaded in series, taking 1024 clock cycles to complete.

Figure 6:
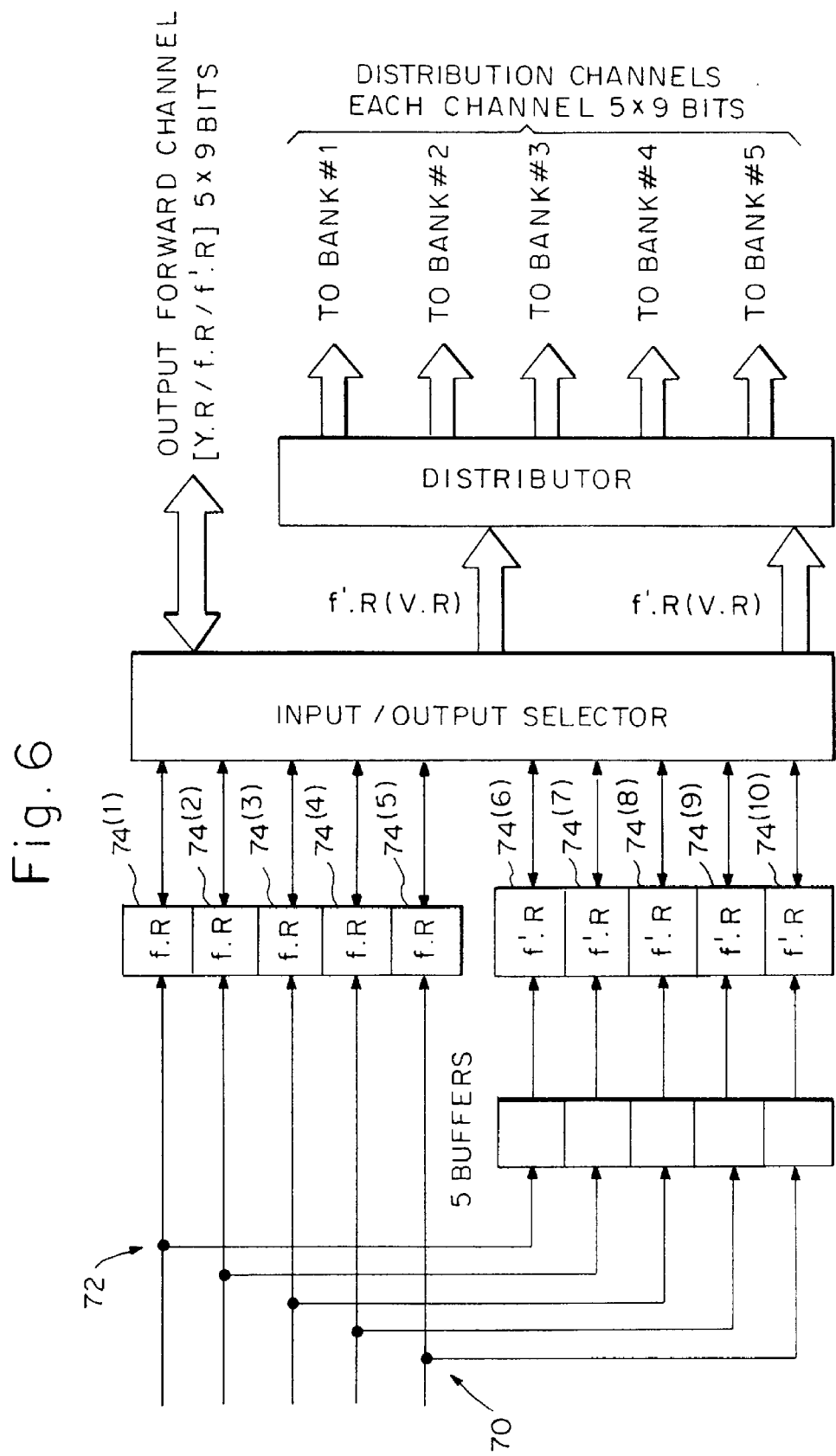
FIG. 6 illustrates a typical structure of a Look Up Table (LUT)

For a better understanding a LUT structure, attention is directed to FIG. 6, illustrating one possible structure of a LUT 72 (shown also in FIG. 5). The 5 bus entry 70 is delivered from the forward bias stage (68 in FIG. 5). Each neuron from among the 25 neurons of the forward cascade utilized the f.R function whereas each neuron from among the 25 neurons of the backward cascade utilizes a derivative function f.R, thereby seemingly requiring 50 distinct LUTs, i.e. a LUT per neuron. Preferably, the access to the LUTs is implemented in a systolic manner such that the output of the 50 neurons is subject to only 10 LUTs in five consecutive cycles. Thus, in each cycle the output of distinct 5 neurons, from among the 25 neurons of the forward cascade is subject to respective 5 instances of a LUT $74^{(1)}$, $74^{(2)}$, $74^{(3)}$, $74^{(4)}$, and $74^{(5)}$ (all realizing the same function f.R). In a similar manner, in each cycle the output of distinct 5 neurons, from among the 25 neurons of the backward cascade is subject to respective 5 instances of a LUT $74^{(6)}$, $74^{(7)}$, $74^{(8)}$, $74^{(9)}$, and $74^{(10)}$ (all realizing the same derivative function f.R). To sum up, 5 instances of the same LUT (realizing f.R) are employed for the forward cascade and 5 instances of another LUT (realizing f.R) are employed for the backward cascade.

Those versed in the art will readily appreciate that the proposed realization of LUTs as depicted in FIG. 6, is only one out of many possible variants.

Processing

There follows a typical sequence of operations in a digital neural network of the kind depicted in FIG. 3 and FIG. 4 and with reference also to Table II below. As illustrated in the table, the lines are broken down by neuron banks, i.e. first line, N1–N5, which all reside in the first bank 12 in FIG. 4, the second line covers neuron N6–N10, all residing in a second bank 14 in FIG. 4, and so forth. The description below will focus on the forward processing within the context of one layer as depicted in FIG. 4 (i.e. forward constituent $30^{(1)}$ in FIG. 3). The columns in Table II are indicative of clock cycles and as shown the table extends to 16 clock cycles.

Assuming that the chips' forward constituent $30^{(1)}$ has been operating for a long time, the hereinbelow description commences at a following cycle (designated as cycle 1) and the forward constituent continues to operate after the last cycle in the table (cycle 16).

The description below will, occasionally, refer also to FIG. 5, depicting one possible hardware realization of a physical neuron 60. It should be noted that the operation of a physical neuron complies with the general concept that has been described with reference to FIG. 1.

Thus, at cycle 1, neurons N1–N5 receive the input of a first data set of data example A containing data packets 1–5 (each being representative of a pixel from among the 5×5 neighboring pixels), so that each neuron receives all five packets. The input forward channel of the neuron is illustrated in FIG. 5 where, as shown, the neuron is capable of receiving the five single input packets by the intermediary of 5 9-bit input register 62. Reverting now to FIG. 4, the other neurons (N6–N25) complete previous computations as will be further clarified in the description below.

The input packets are also fed to the five input registers designated collectively as 27 in the first bank of FIG. 4. Each one of the neurons N1–N5 processes the 5 data packets in the manner specified with reference to FIG. 1, i.e. weighted-multiplication summation and LUT operation, utilizing to this end sub-modules $64^{(1)}$, $64^{(2)}$, $64^{(3)}$, $64^{(4)}$, $64^{(5)}$ 66, 68 and 72 that are depicted in FIG. 5. It should be noted that, whilst for simplicity, the LUT table is depicted as an integral portion of the neuron architecture, this is normally not the case, since the LUT table is preferably utilized as a separate module shared by more than one neuron (and by this particular embodiment by all the neurons).

Next, and as shown in column 2 of Table II, a second data set containing data packets 6–10 of example A are fed simultaneously to neurons N1–N5, whilst at the same time, the previous input 1–5 is fed from 5 input registers 27 to each one of neurons N6–N10 in the second bank 14. Put differently, N6–N10 receive a delayed input of the data packet 1–5. The procedure continues in a similar manner in cycles 3 and 4 and in cycle 5 neurons N1–N5 receive, each, the fifth data set consisting of data packets 21–25, neurons N6–N10 receive, each, delayed inputs of data packets 16–20; neurons N11–N15 receive, each, delayed inputs of data packets 11–15; neurons N16–N20 receive, each, delayed inputs of data packets 6–10 and neuron N21–N25 receive, each, delayed input of data packets 1–5 of data example A. In cycle 6, neurons N1–N5 receive data packets of a new data example B.

In cycle 11, each one of the neurons N1–N5 is capable of producing an output since it has already processed the entire 25 input packets (in five cycles). By this particular example the five cycle delay from the receipt of the last input sequence (i.e. data packets 21–25 in cycle 5) until the result (i.e. processed data example that is actually delivered from neurons N1–N5 (in cycle 11) stems from 3 cycles for summation (in unit 66) one cycle for bias calculation in module 68 and one cycle for LUT calculation (72). The resulting output has been fed from the forward biased stage 68 to a sum channel 70 (FIG. 5) and has been fed by means of output lines to a multiplexer which has routed its output to LUT 72 and therefrom to the output. The latter procedure is shown in FIG. 4 (which shows, for clarity, only N1 and N5 from among neurons N1–N5). Thus, as can be seen with respect to N1, the output result (9-bit long) is fed through line 29 to a multiplexer 50$^{(1)}$ and therefrom to output channel 26$^{(1)}$ after having been subject to output function 52$^{(1)}$. Simultaneously, the remaining neurons N2–N5 are fed through their respective multiplexer to their respective output channel to thereby generate five simultaneous results 9-bits long each. In the case of multi-layer as illustrated in FIG. 3, the resulting output of the first constituent 30$^{(1)}$ is fed to the next constituent 32$^{(1)}$. Turning back to FIG. 4, those versed in the art will readily appreciate that the multiplexer 50$^{(1)}$ whilst enabling to route input 29 to the output disables the remaining four inputs that are coupled to neurons N6, and N11 (not shown), N16 (not shown) and N21.

Reverting now to cycle 11 of Table II, the remaining neurons N6–N10 process delayed data packets 21–25 of data example B; neurons N11–N15 process delayed inputs 16–20; N16–N20 process delayed data packets 11–15 and N21–N25 process delayed data packets 6–10.

During the same cycle (11), neurons N1–N5 also commence a new cycle of calculation and receive input packets (1–5) that belong to the next 25 inputs of data example C. During succeeding cycles 12, 13, 14 and 15 N1–N5 will process the remaining packets 6 to 25 in order to yield the next output in cycle 21 (not shown).

Reverting now to cycle 12, neurons N6–N10 are now capable of generating an output after having processed all 25 data packets of data example A. In cycle 12, N11–N15, N16–N20 and N21–N25 continue to receive the appropriate input for processing. As shown, in cycles 13, neurons N11–N15 produce an output, and likewise in cycles 14 and 15, neurons N16–N20 produce their respective outputs.

As shown in FIG. 4, the resulting output of cycle 15 has been fed from neuron N21 and N25 (neuron 22–24 are not shown in FIG. 4) through buses 33$^{(1)}$ and 33$^{(2)}$ respectively, and accordingly, multiplexers 50$^{(1)}$ and 52$^{(2)}$ have enabled the routing of theses buses to the respective outputs whilst having disabled the other inputs fed from N1, N6, N11 and N16 (multiplexer 50$^{(1)}$) and N5, N10, N15 and N20 (multiplexer 51$^{(2)}$). The procedure which has just been described with reference to the forward processing applies mutatis mutandis to the backward processing which is carried out e.g. in the backward constituent chip 34($^{2}$)in FIG. 3.

TABLE II

| | | | 1 | 2 | 3 | 4 | 5 | 6 | 7 | 8 | 9 | 10 |
|---|---|---|---|---|---|---|---|---|---|---|---|---|
| Chip Input | Data Example | | | | A | | | | | B | | |
| | Data Sets | | 1 | 2 | 3 | 4 | 5 | 1 | 2 | 3 | 4 | 5 |
| N1–N5 | in | | 1–5 | 6–10 | 11–15 | 16–20 | 21–25 | 1–5 | 6–10 | 11–15 | 16–20 | 21–25 |
| | out | | YYY | | | | | ZZZ | | | | |
| N6–N10 | in | | 21–25 | 1–5 | 6–10 | 11–15 | 16–20 | 21–25 | 1–5 | 6–10 | 11–15 | 16–20 |
| | out | | | YYY | | | | | ZZZ | | | |
| N11–N15 | in | | 16–20 | 21–25 | 1–5 | 6–10 | 11–15 | 16–20 | 21–25 | 1–5 | 6–10 | 11–15 |
| | out | | | | YYY | | | | | ZZZ | | |
| N16–N20 | in | | 11–15 | 16–20 | 21–25 | 1–5 | 6–10 | 11–15 | 16–20 | 21–25 | 1–5 | 6–10 |
| | out | | | | | YYY | | | | | ZZZ | |
| N21–N25 | in | | 6–10 | 11–15 | 16–20 | 21–25 | 1–5 | 6–10 | 11–15 | 16–20 | 21–25 | 1–5 |
| | out | | | | | | YYY | | | | | ZZZ |
| Chip Output | Processed Data Example | | | | Y | | | | | Z | | |
| | From Neurons | | 1–5 | 6–10 | 11–15 | 16–20 | 21–25 | 1–5 | 6–10 | 11–15 | 16–20 | 21–25 |

| | | | 11 | 12 | 13 | 14 | 15 | 16 |
|---|---|---|---|---|---|---|---|---|
| Chip Input | Data Example | | | | C | | | D |
| | Data Sets | | 1 | 2 | 3 | 4 | 5 | 1 |
| N1–N5 | in | | 1–5 | 6–10 | 11–15 | 16–20 | 21–25 | 1–5 |
| | out | | AAA | | | | | BBB |
| N6–N10 | in | | 21–25 | 1–5 | 6–10 | 11–15 | 16–20 | 21–25 |
| | out | | | AAA | | | | |
| N11–N15 | in | | 16–20 | 21–25 | 1–5 | 6–10 | 11–15 | 16–20 |
| | out | | | | AAA | | | |
| N16–N20 | in | | 11–15 | 16–20 | 21–25 | 1–5 | 6–10 | 11–15 |
| | out | | | | | AAA | | |

TABLE II-continued

| | | 6–10 | 11–15 | 16–20 | 21–25 | 1–5 | 6–10 |
|---|---|---|---|---|---|---|---|
| N21–N25 | in | | | | | | |
| | out | | | | | AAA | |
| Chip Output | Processed Data Example | | | A | | | B |
| | From Neurons | 1–5 | 6–10 | 11–15 | 16–20 | 21–25 | 1–5 |

Attention is now directed to Table II-A below which illustrates the operation of both the forward and backward cascade of neurons with respect to a succession of data examples (designated as A-P) and extending over 80 cycles of computation. As before, it is assumed that the neural network has been operating for a long time before cycle 1 and continues to operate after cycle 80. Unlike Table II, the rows in Table II-A are broken down by layers, i.e. layer 1–layer 3 of the forward cascade and layer 3 layer–layer 1 of the backward cascade. The rows in Table II-A correspond to the six constituents $30^1$, $32^1$, $34^1$, $34^2$, $32^2$ and $30^{(2)}$, respectively. Each of the forward layers is further partitioned into "in" and "out" rows and each backward layer is further partitioned to "error in", "past input" and "error out" rows.

As shown in Table II-A, in clock cycles 1–5 the five sets of data example A are fed to the forward layer 1, i.e. constituent $30^{(1)}$ in FIG. 3. In cycles 11–15 partially processed data example A leaves forward layer 1 and enters forward layer 2 and past input of layer 2. The partially processed data is referred to as the given data example that is fed from the forward to the backward layer. Said given data example may, likewise be a row data example that is fed to the first layer of the forward cascade or fully processed data as the case may be. By partially processed data example it is meant that data example layer has been processed by neurons N1–N5 (see Table II) and is entering the first out of 7 registers that interconnect constituent $30^{(1)}$ of the forward cascade with constituent $32^{(2)}$ of the backward cascade. The latter is illustrated by indication of "A" in the past input row of backward layer 2 in cycles 11–15. As clearly arises from Table II-A, the processing of the entire Example A by neurons N1–N25 takes 25 cycles and 5 more cycles are required for the specified summation, bias and LUT calculations, giving rise to the delivery of a fully processed data example A at the output of forward layer 3 at cycles 31–35. Indeed as shown in Table II-A the output of forward layer 3 presents a processed data example A in cycle 31–35. At the same time it is fed via bus 33' to the input of backward layer 3, (i.e. constituent $34^{(2)}$, as indicated by the letter "A" in the "error in" line of backward layer 3. The desired output of example A is fed simultaneously via channel 33. As is clearly shown in the "past input" line, the partially processed example A that was fed to register 40(1) in cycle 21–25 has now propagated through register 40$^{(2)}$ and 40$^{(3)}$ and is fed to a backward layer 3, (i.e. constituent $34^2$ in FIG. 3). In cycles 31–35, the backward layer 3 is capable of producing an error of processed data example A on the basis of desired output of example A, fully processed example A and partially processed example A, in compliance with algorithmic expression 9. Accordingly and as shown in cycles 41–45, backward layer 3 produces error of processed example A (designated as "error out") in backward layer 3 and the specified error is passed back to backward layer 2 (shown in the "error in" line of backward line 2). Backward layer 2 is now capable of processing also the partially processed example A after the latter was subject to delay by 7 registers that interconnect the first layer in the forward cascade to the second layer in the backward cascade. The propagation of the latter partially processed example A is depicted in Table II-A in the "past input" row of backward layer 2 commencing from cycle 11–15 and ending at cycle 41–45. Layer 2 is now capable of calculating an error of processed example A in compliance with algorithmic expression 10.

Layer 2 will deliver "error out" results (in compliance with algorithmic expression 10) at cycles 51–55 and the latter will be fed at the same cycle to backward layer 1 as "error in" data ("error in" signifies an error of processed example). Layer 1 will utilize at the same cycle the past input data that has been propagated through 11 registers $36^{(1)}$ to $36^{(11)}$ and is capable, in its turn, to calculate an error of processed example A in compliance with algorithmic expression 10. In cycles 61–65 backward layer 1 completes the learning phase with respect to Example A and produces as an output an error of processed example A.

It is accordingly appreciated that there are required 11 registers to interconnect the input of the first layer in the forward cascade to backward layer 1 of the backward cascade and likewise 7 registers and 3 registers are required to interconnect the input of the second and third layer in the forward cascade to the corresponding layer 3 and layer 2 of the backward cascade. Since each register holds one data example that contains 25 packets (each 9 bits long), the size of this register is 225 bits.

The maximum size of images that may be processed in real-time (30 images per second) depends on the most heavily loaded layer in the network. The load is a function of the number of inputs in a single data example and the number of neurons used. The overall network processing rate is limited by the processing speed of its most heavily loaded layer. Table III summarizes processing capabilities in terms of clock cycles as functions of the network and image neighborhood sizes, and shows the implication of real-time image processing.

TABLE II-A

| | | Clock Cycles | | | | | | | |
|---|---|---|---|---|---|---|---|---|---|
| | | 1–5 | 6–10 | 11–15 | 16–20 | 21–25 | 26–30 | 31–35 | 36–40 |
| Network Input | Data Example | A | B | C | D | E | F | G | H |
| Forward Layer 1 | in | A | B | C | D | E | F | G | H |
| | out | | A | B | C | D | E | F |

TABLE II-A-continued

| | | Clock Cycles | | | | | | | |
|---|---|---|---|---|---|---|---|---|---|
| | | 1–5 | 6–10 | 11–15 | 16–20 | 21–25 | 26–30 | 31–35 | 36–40 |
| Forward Layer 2 | in | | | A | B | C | D | E | F |
| | out | | | | | A | B | C | D |
| Forward Layer 3 | in | | | | | A | B | C | D |
| | out | | | | | | | A | B |
| Backward Layer 3 | error in | | | | | | | A | B |
| | Past Input | | | | | | | A | B |
| | | | | | | | A | B | C |
| | | | | | | A | B | C | D |
| | error out | | | | | | | | |
| Backward Layer 2 | error in | | | | | | | | |
| | Past Input | | | | | | | | A |
| | | | | | | | | A | B |
| | | | | | | | A | B | C |
| | | | | | | A | B | C | D |
| | | | | A | B | C | D | E |
| | | | A | B | C | D | E | F |
| | error out | | | | | | | | |
| Backward Layer 1 | error in | | | | | | | | |
| | Past Input | | | | | | | | A |
| | | | | | | | | A | B |
| | | | | | | | A | B | C |
| | | | | | | A | B | C | D |
| | | | | | A | B | C | D | E |
| | | | | A | B | C | D | E | F |
| | | | A | B | C | D | E | F | G |
| | | A | B | C | D | E | F | G | H |
| | error out | | | | | | | | |

| | | Clock Cycles | | | | | | | |
|---|---|---|---|---|---|---|---|---|---|
| | | 41–45 | 46–50 | 51–55 | 56–60 | 61–65 | 66–70 | 71–75 | 76–80 |
| Network Input | Data Example | I | J | K | L | M | N | O | P |
| Forward Layer 1 | in | I | J | K | L | M | N | O | P |
| | out | G | H | I | J | K | L | M | N |
| Forward Layer 2 | in | G | H | I | J | K | L | M | N |
| | out | E | F | G | H | I | J | K | L |
| Forward Layer 3 | in | E | F | G | H | I | J | K | L |
| | out | C | D | E | F | G | H | I | J |
| Backward Layer 3 | error in | C | D | E | F | G | H | I | J |
| | Past Input | C | D | E | F | G | H | I | J |
| | | D | E | F | G | H | I | J | K |
| | | E | F | G | H | I | J | K | L |
| | error out | A | B | C | D | E | F | G | H |
| Backward Layer 2 | error in | A | B | C | D | E | F | G | H |
| | Past Input | A | B | C | D | E | F | G | H |
| | | B | C | D | E | F | G | H | I |
| | | C | D | E | F | G | H | I | J |
| | | D | E | F | G | H | I | J | K |
| | | E | F | G | H | I | J | K | L |
| | | F | G | H | I | J | K | L | M |
| | | G | H | I | J | K | L | M | N |
| | error out | | | A | B | C | D | E | F |
| Backward Layer 1 | error in | | | A | B | C | D | E | F |
| | Past Input | | | A | B | C | D | E | F |
| | | | A | B | C | D | E | F | G |
| | | A | B | C | D | E | F | G | H |
| | | B | C | D | E | F | G | H | I |
| | | C | D | E | F | G | H | I | J |
| | | D | E | F | G | H | I | J | K |
| | | E | F | G | H | I | J | K | L |
| | | F | G | H | I | J | K | L | M |
| | | G | H | I | J | K | L | M | N |
| | | H | I | J | K | L | M | N | O |
| | | I | J | K | L | M | N | O | P |
| | error out | | | | | A | B | C | D |

In the following Table III:
column 1: Define as n (n≦25)
column 2: Define as e (e≦25)
column 3: BCO=max(n,e)/5, where BCO stands for "between consecutive inputs;
column 4: if n>=c
then CBE=(n−e)/5
else CBE=0, where CBE stands for cycles between the end of one example and the beginning of the next example column 5: MIS=F/(30*BCO), where MIS stands for maximum image size, presented as sqrt(MIS) * sqrt(MIS))

TABLE III

| Max. Neurons in a layer | Max. Inputs in a Data Example | Clock Cycles Between Consecutive Outputs of the Same Neuron | Clock Cycles Between the End of a Data Example (CBE) | Max. RT Image Size Forward Processed (Pixels) |
|---|---|---|---|---|
| 5 | 5 | 1 | 0 | 1230 × 1230 |
| 5 | 10 | 2 | 0 | 850 × 850 |
| 5 | 15 | 3 | 0 | 700 × 700 |
| 5 | 20 | 4 | 0 | 600 × 600 |
| 5 | 25 | 5 | 0 | 550 × 550 |
| 10 | 5 | 2 | 1 | 850 × 850 |
| 10 | 10 | 2 | 0 | 850 × 850 |
| 10 | 15 | 3 | 0 | 750 × 750 |
| 10 | 20 | 4 | 0 | 600 × 600 |
| 10 | 25 | 5 | 0 | 550 × 550 |
| 15 | 5 | 3 | 2 | 700 × 700 |
| 15 | 10 | 3 | 1 | 700 × 700 |
| 15 | 15 | 3 | 0 | 700 × 700 |
| 15 | 20 | 4 | 0 | 600 × 600 |
| 15 | 25 | 5 | 0 | 550 × 550 |
| 20 | 5 | 4 | 3 | 600 × 600 |
| 20 | 10 | 4 | 2 | 600 × 600 |
| 20 | 15 | 4 | 1 | 600 × 600 |
| 20 | 20 | 4 | 0 | 600 × 600 |
| 20 | 25 | 5 | 0 | 550 × 550 |
| 25 | 5 | 5 | 4 | 550 × 550 |
| 25 | 10 | 5 | 3 | 550 × 550 |
| 25 | 15 | 5 | 2 | 550 × 550 |
| 25 | 20 | 5 | 1 | 550 × 550 |
| 25 | 25 | 5 | 0 | 550 × 550 |

Concluding an Epoch

Updating the weights and biases of the DSNC neurons takes place after the last weight-change calculation is concluded for the last input example of the epoch. Each cycle, one weight in each forward weight register pile is updated, using the change-weight piles. This update is carried out from the last to first weight in the pile. This order exploits the systolic architecture in the same manner as explained above, and only 125 clock cycles are thus required for passing the new forward weights to the backward stages of the previous layer.

Network Architecture

Figure 8:
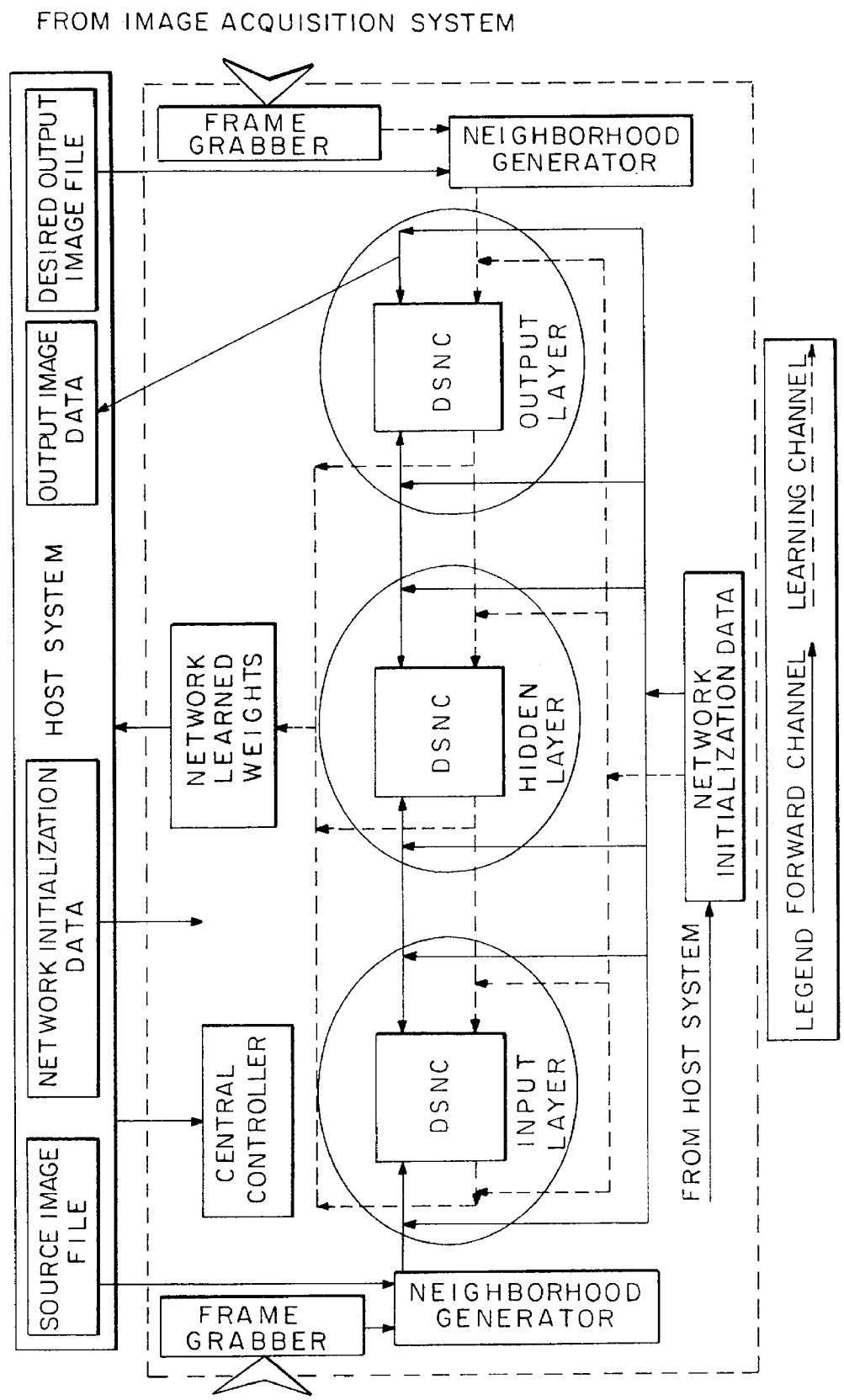
FIG. 8 illustrates one possible hardware realization of a 3-layer architecture, according to one embodiment of the invention.

There are several possibilities of employing DSNCs in constructing multi-layer neural networks. An entire network can be constructed easily using several DSNC (which, as recalled, by a specific non limited example that has been referred to above each DSNC realizes one layer) by simply interconnecting the appropriate channels. Such a 3-layer network system is demonstrated in FIG. 8. The 3-layer architecture of FIG. 8 may reside, e.g. in an extension board that is installed in a conventional P.C. (hereinafter "host computer") Pentium® base P.C. employing a PCI communication bus for communicating with the specified board. The initial data for operation (network topology, weights, biases, learning-rate, output and derivative function) can be stored in memories or supplied by a host computer. The processed images can come from an image acquisition systems, e.g CCD camera coupled to the host computer or, if desired, be retrieved from image files stored in or received by the host. In any case, neighborhood generators are responsible for arranging the pixels into the required data sets and feed them successively into the network. While learning, the calculated new weights and biases can be sent to the host system. By monitoring the Output Learning Channel the host computer can track the learning process.

The same 3-layer network can be built with only one DSNC, executing different layers at different times. This implementation is less expensive but performs slightly slower than three times when in Forward mode and slightly slower than six times while learning, due to the time required to store intermediate data packets in external memories and retrieve the same, and the time required to modify weights, biases, learning rates, output and derivative functions, for each layer.

Figure 7:
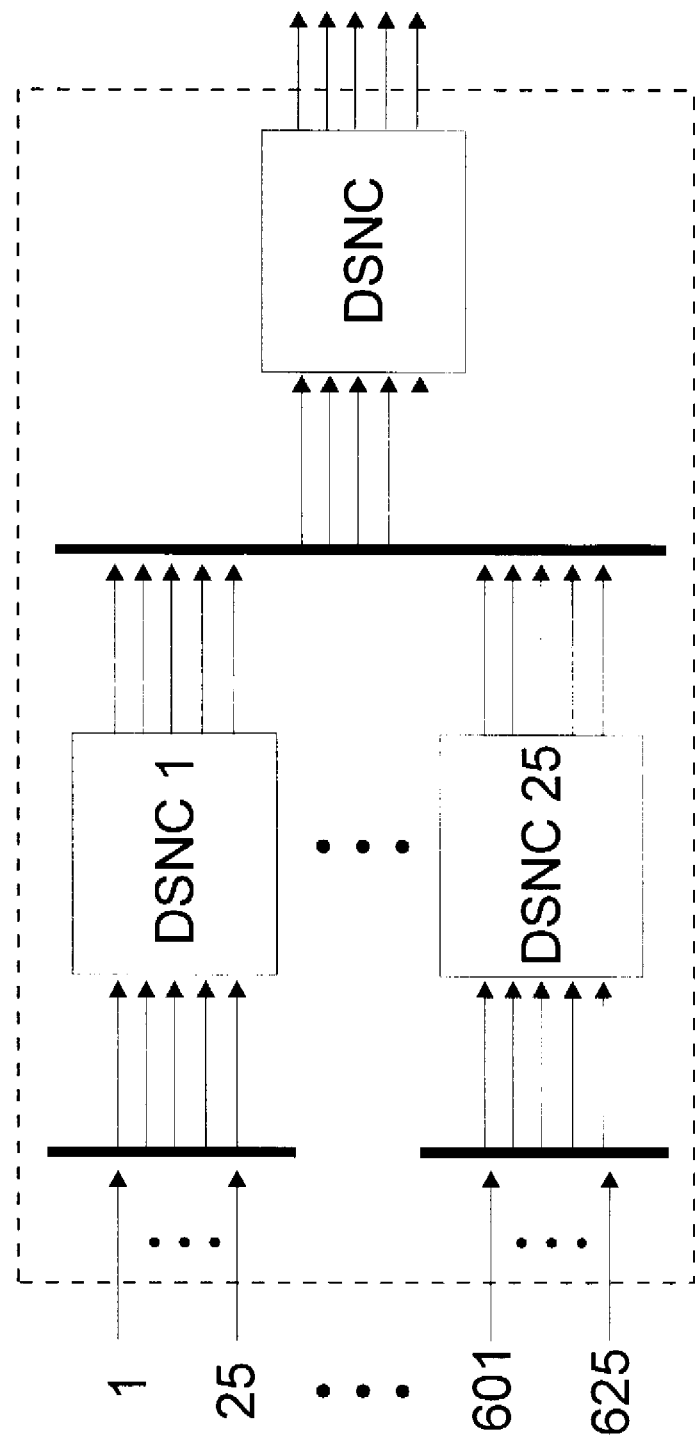
FIG. 7 illustrates a layer that employs plurality of interconnected Digital Systolic Network Chip (DSNC), according to one embodiment of the invention.

As depicted for example in FIG. 7, more than 25 neurons and/or 25 inputs can be incorporated into one layer by employing several DSNCs. The most obvious implementation is based on a two-level hierarchy: the first level, having multiple DSNCs, creates intermediate sums of 25 weighted inputs (in each DSNC). In the second level, another DSNC sums them up and applies the output function. For example, 26 DSNCs arranged in two such levels can emulate a single layer of 25 neurons capable of processing 625 data packets in one data example, e.g. representing 25×25 pixel neighborhood.

Reverting now to the realization depicted in FIG. 2, by one non limiting embodiment, the DSNC has been designed with a commercial 0.8μ CMOS standard cell VLSI library. This design integrates 600K gates and 180 data I/O pins. The critical path includes a 22 nsec 9-bits multiplication (see Appendix), and consequently this DSNC design achieves a 45.4 MHz operating frequency. Thus, single chip can process in real-time (30 images per second) an image of 550×550 pixels if a 5×5 pixel neighborhoods or 25 neurons in a single layer are used. Those versed in the art will readily appreciate that larger images (up to 1230×1230 pixels) can be processed in real-time when using smaller neighborhoods and fewer neurons in each layer, depicted in Table II.

Figure 9:
FIGS. 9–11 illustrate, respectively, an input image, desired output image and network output image in an image processing application of the digital neural network of the invention.
Figure 10:
Figure 11:

To test the ability of such a limited numeric precision architecture to learn and process early-vision tasks, an explicit structural simulation of the architecture was written in PASCAL. An edge detection task was then learned using a 256 gray level image (FIG. 9), 1024 examples of 3×3 pixel neighborhoods from the same image, and 1024 corresponding desired output pixels taken from a desired output image (FIG. 10). The network contained two layers with seven neurons in the first layer and one neuron in the second layer. The initial weights were empirically selected in random from the ranges [−127,−120] and [120,127]. The output functions of the first and second layers were empirically set as hyperbolic tangent and sigmoid, respectively. The learning-rate was constantly equal to one. The number of epochs required was 49. The result image (FIG. 11) was generated by forwarding the input image (FIG. 9) through the network and thresholding it at the gray level of 221. The test indicates that, at least for some image processing tasks, the limited numeric precision of the architecture is quite sufficient.

The numeric precision of the DSNC architecture has been determined empirically. It is optimized for a certain class of algorithms, and accordingly a different precision other than 8 bits for weight and bias and 9 bits size for data may be required for other algorithms. Digital simulations should be carried out to compare the performance and the quality of the results over a number of different precisions, until the appropriate precision is identified.

The DSNC architecture combines both forward processing and learning. Certain applications may not require learning, and for them a subset of the architecture, with only forward processing hardware, can be designed. As explained in the Appendix hereinbelow, about ⅔ of the number of gates i.e. 447,595 out of 617,640 may be eliminated in such cases. This could lead to either smaller chips or to higher performance architectures. For instance, using the same technology and size of chip as in the Appendix, a 1230×1230 or larger images can be processed in real-time.

Combining the learning with forward processing, and providing for maximum rate learning, is highly desirable in some applications. When data attributes change often, continual learning is an integral part of processing, and it should not delay normal forward processing. When real-time image data are processed, additional large image storage buffers would have been required if learning were to be performed at rates slower than the real-time data input rate. Finally, training neural networks is an important task by itself, and often requires a large number of empirical iterations. Thus, the DSNC is also intended for use in special purpose workstations for neural network development.

Neural networks can offer an attractive implementation for some complex image processing algorithms; their self-learning capability often helps overcome the extreme difficulty of constructing conventional image processing algorithm for non-trivial tasks. High performance architectures for neural network processing are required in order to execute image processing algorithms at video rates.

Appendix

In this appendix the hardware and timing complexity that are used in evaluating the architectures in Section 3 are shown. The analysis is based on a CMOS 0.8μ standard cell library.

Hardware Complexity is shown in Table A-I and A-II.

Timing considerations are shown in Table A-I.

TABLE A-I

Timing for dominant functional units

| Name | Time in nsec |
|---|---|
| CMOS Static RAM - 512 entry, 10 bit width, access time | 13.6 |
| 9 × 9 bit signed 2's complement multiplier + output register | 22 |
| 9 bit signed 2's complement full adder + output register | 12.9 |
| 18 bit signed 2's complement full adder + output register | 13.4 |

TABLE A-II

| Entity | Total Gate Equivalent | ONE neuron (Forward) #parts | ONE neuron (Forward) total | ONE neuron (Backward) #parts | ONE neuron (Backward) total | Total in ONE neuron |
|---|---|---|---|---|---|---|
| 8 bit register | 80 | — | — | 6 | 480 | 480 |
| 9 bit register | 89 | 13 | 1157 | 34 | 3026 | 4183 |
| 10 bit register | 97 | 2 | 194 | 2 | 194 | 388 |
| 11 tit register | 106 | 1 | 106 | 1 | 106 | 212 |
| 12 bit register | 115 | 1 | 115 | 1 | 115 | 230 |
| 14 bit register | 132 | 1 | 132 | 1 | 132 | 264 |
| 18 bit register | 166 | — | — | 26 | 4316 | 4316 |
| bias | 153 | 1 | 153 | — | — | 153 |
| 9 bit adder | 70.5 | 2 | 141 | 3 | 211.5 | 353 |
| 10 bit adder | 78.0 | 1 | 78 | 1 | 78 | 156 |
| 11 bit adder | 85.5 | 1 | 85.5 | 1 | 85.5 | 171 |
| 14 bit adder | 100.5 | 1 | 100.5 | 1 | 100.5 | 201 |
| 18 bit adder | 130.5 | — | — | 6 | 783 | 783 |
| 8 × 9 bit multiplier | 574 | 5 | 2870 | 11 | 6314 | 9184 |
| 9 × 9 bit multiplier | 622 | — | — | 1 | 622 | 622 |
| 5 8–bit weights | 140.5 | 5 | 702.5 | 5 | 702.5 | 1405 |
| 9 out–of 14 bit selector | 148.5 | 1 | 148.5 | 1 | 148.5 | 297 |
| Total ONE Neuron |  |  | 5983 |  | 17415 | 23398 |
| Total 25 Neurons |  |  | 149,575 |  | 435,375 | 584,950 |
| stack of 5 9–bit registers (past inputs) | ~150 (estimate) | 55 |  |  |  | 8250 |
| 512 9–bit RAM (LUT) | 2444 | 5 | 12,220 | 5 | 12,220 | 24,440 |
| Total DSNC |  |  | 161,795 |  | 447,595 | 617,640 |

The invention has been particularly described with a certain degree of particularity, but it should be understood that various alterations and modifications may be performed, without departing from the spirit and scope of the invention as hereinafter claimed.

What is claimed is:

1. A digital neural network architecture comprising a forward cascade of layers of neurons for forward processing of data examples that include, each, a plurality of data packets; and a backward cascade of layers neurons, having at least one input channel and at least one output channel, for backward propagation learning of respective errors of said processed data examples; each packet being of a given size;

a forward cascade of $l(l>1)$ layers of neurons having respective indices $(1, \ldots l)$, each layer$_i$ $(i=1 \ldots l)$ in said cascade having n neurons and the following layer structure (a) being coupled to an input channel of at least one $k_{i1}$ input busses and an output channel of $k_{i2}$ output busses; and (b) having at least one bank of neurons where each bank includes mi neurons where $m_i=k_{i1}*i_i$, $n_i=m_i*j_i$ and $m_i=k_{i2}*o_i$; $n_i$ constituting the number of neurons in each layer; $j_i$ constituting the number of banks in each layer; $m_i$ constituting the number of neurons in each bank; $i_i$ and $o_i$ being integers;

said digital neural network architecture further comprising:

a backward cascade of l layers of neurons having respective indices (l+1, . . . 2l) and having each said layer structure, with the input layer of the backward cascade, having said index l+1, being inter-connected to both the output layer of said forward cascade, having said index l, and to—additional output, thereby constituting a cascade of 2l layers each associated with essentially identical propagation period T where the latter being the elapsed time for propagating data between the at least one input channel and at least one output channel of each layer, from among said 2l layers;

said digital neural network architecture further having inter-layer pipeline structure for attaining systolic operation of said backward and forward cascades such that the input to each layer having index i in the forward cascade is also fed as input, after having been delayed for a delay period $T_i$ by said inter-layer structure that include hard-wired logic to a corresponding layer having index (2l−i+1) in the backward cascade, such that said delay time $T_i$ equals (4l−4i+3) times said propagation period T.

2. The digital network according to claim 1, wherein either or both of $i_i$ and $j_i$ are integers.

3. A digital neural network architecture according to claim 1, wherein said network is successively fed with data examples for continuously updating a set of weights associated with each one of said 2 l layers, thereby accomplishing fast training mode of operation.

4. The digital network according to claim 1, wherein each one of said layers is realized as a separate Digital Systolic Network Chip (DSNC).

5. The digital network according to claim 1, wherein each one of said layers is realized as at least two interlinked Digital Systolic Network Chip (DSNC).

6. A digital neural network according to claim 1, for use in real-time image processing.

7. A digital neural network according to claim 6, wherein l=3, $m_i$=5 for $1 \leq i \leq 5$, n=5, for real-time image processing of images, wherein each image consists of essentially 550*550 pixels.

* * * * *